United States Patent
Ihle et al.

(10) Patent No.: US 10,788,377 B2
(45) Date of Patent: Sep. 29, 2020

(54) SENSOR ELEMENT AND METHOD FOR PRODUCING A SENSOR ELEMENT

(71) Applicant: EPCOS AG, Munich (DE)

(72) Inventors: Jan Ihle, Raaba-Grambach (AT); Anke Weidenfelder, Graz (AT); Christl Lisa Mead, St. Martin Island (AT); Gerald Kloiber, Feldkirchen (AT)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 15/772,790

(22) PCT Filed: Oct. 18, 2016

(86) PCT No.: PCT/EP2016/074942
§ 371 (c)(1),
(2) Date: May 1, 2018

(87) PCT Pub. No.: WO2017/076631
PCT Pub. Date: May 11, 2017

(65) Prior Publication Data
US 2019/0204162 A1    Jul. 4, 2019

(30) Foreign Application Priority Data

Nov. 2, 2015 (DE) .......... 10 2015 118 720
Jan. 25, 2016 (DE) .......... 10 2016 101 248

(51) Int. Cl.
| | |
|---|---|
| G01K 7/22 | (2006.01) |
| G01K 7/16 | (2006.01) |
| B28B 3/02 | (2006.01) |
| B28B 11/24 | (2006.01) |
| H01C 7/04 | (2006.01) |
| H01C 17/28 | (2006.01) |

(Continued)

(52) U.S. Cl.
CPC .......... *G01K 7/22* (2013.01); *B28B 3/02* (2013.01); *B28B 11/243* (2013.01); *G01K 7/16* (2013.01); *G01K 7/18* (2013.01); *H01C 7/008* (2013.01); *H01C 7/043* (2013.01); *H01C 17/08* (2013.01); *H01C 17/12* (2013.01); *H01C 17/281* (2013.01); *H01C 17/283* (2013.01); *H01C 17/075* (2013.01)

(58) Field of Classification Search
CPC .......... G01K 7/22; G01K 7/18; B28B 11/243; H01C 7/008
USPC ........................................... 338/22 R
See application file for complete search history.

(56) References Cited

U.S. PATENT DOCUMENTS

| | | |
|---|---|---|
| 3,477,055 A | 11/1969 | Herbst et al. |
| 3,547,835 A | 12/1970 | Short |

(Continued)

FOREIGN PATENT DOCUMENTS

| | | |
|---|---|---|
| CH | 499856 A | 11/1970 |
| CN | 86108011 A | 1/1988 |

(Continued)

*Primary Examiner* — Nguyen Tran
*Assistant Examiner* — Iman Malakooti
(74) *Attorney, Agent, or Firm* — Slater Matsil, LLP

(57) ABSTRACT

A sensor element and a method for producing a sensor element are disclosed. In an embodiment a sensor element for temperature measurement includes a ceramic carrier and at least one NTC layer printed on the carrier, wherein the NTC layer covers at least part of a surface of the carrier, and wherein the sensor element is designed for wireless contacting.

14 Claims, 1 Drawing Sheet

(51) Int. Cl.
*G01K 7/18* (2006.01)
*H01C 7/00* (2006.01)
*H01C 17/08* (2006.01)
*H01C 17/12* (2006.01)
*H01C 17/075* (2006.01)

(56) References Cited

U.S. PATENT DOCUMENTS

| | | | |
|---|---|---|---|
| 3,989,438 A | | 11/1976 | Smith et al. |
| 4,160,227 A | | 7/1979 | Ikegami et al. |
| 4,230,731 A | | 10/1980 | Tyler |
| 4,359,372 A | | 11/1982 | Nagai et al. |
| 4,518,839 A | | 5/1985 | Taguchi et al. |
| 4,743,881 A | | 5/1988 | Howng |
| 5,140,393 A | | 8/1992 | Hijikihigawa et al. |
| 5,161,893 A | | 11/1992 | Shigezawa et al. |
| 5,406,246 A | | 4/1995 | Friese et al. |
| 5,610,571 A | | 3/1997 | Kuzuoka |
| 6,078,250 A | * | 6/2000 | Ueda ............... H01C 1/14 29/610.1 |
| 6,082,609 A | | 7/2000 | Wienand et al. |
| 6,232,868 B1 | | 5/2001 | Rehnelt |
| 6,245,628 B1 | | 6/2001 | Fukui et al. |
| 6,304,167 B1 | | 10/2001 | Nakayama |
| 6,354,736 B1 | | 3/2002 | Cole et al. |
| 6,368,734 B1 | * | 4/2002 | Mihara ............... C04B 35/01 257/703 |
| 6,636,143 B1 | | 10/2003 | Hashimoto et al. |
| 6,690,258 B2 | | 2/2004 | Katsuki et al. |
| 6,766,574 B2 | | 7/2004 | Mizoguchi et al. |
| 6,856,233 B2 | | 2/2005 | Tsukada et al. |
| 7,164,341 B2 | | 1/2007 | Katsuki et al. |
| 7,292,132 B1 | | 11/2007 | Kozhukh et al. |
| 7,312,690 B1 | | 12/2007 | Geer |
| 7,420,319 B2 | | 9/2008 | Kastl et al. |
| 7,432,123 B1 | | 10/2008 | Kozhukh |
| 7,547,407 B2 | | 6/2009 | Matsuda et al. |
| 8,228,160 B2 | | 7/2012 | Kloiber et al. |
| 8,373,535 B2 | | 2/2013 | Lavenuta |
| 8,519,866 B2 | | 8/2013 | Mitchell et al. |
| 8,598,975 B2 | | 12/2013 | Miura |
| 8,946,885 B2 | | 2/2015 | Krauss |
| 9,040,338 B2 | | 5/2015 | Eisele |
| 9,620,266 B2 | | 4/2017 | Ortner et al. |
| 2001/0001205 A1 | | 5/2001 | Ishikawa et al. |
| 2003/0001261 A1 | | 1/2003 | Ueda et al. |
| 2003/0178396 A1 | | 9/2003 | Naumov et al. |
| 2005/0101843 A1 | | 5/2005 | Quinn et al. |
| 2006/0012247 A1 | | 6/2006 | Kill et al. |
| 2008/0219319 A1 | | 9/2008 | Buckalew |
| 2009/0040009 A1 | * | 2/2009 | Goto ............... H01C 7/003 338/307 |
| 2009/0268779 A1 | | 10/2009 | Hotta et al. |
| 2010/0226757 A1 | | 9/2010 | Mitchell et al. |
| 2011/0068890 A1 | * | 3/2011 | Yang ............... H01C 1/14 338/22 R |
| 2011/0277913 A1 | | 11/2011 | Kuegerl et al. |
| 2012/0049997 A1 | | 3/2012 | Lim et al. |
| 2013/0187748 A1 | * | 7/2013 | Sha ............... H01C 1/084 338/22 R |
| 2013/0228890 A1 | | 9/2013 | Eisele |
| 2013/0300533 A1 | | 11/2013 | Bisplinghoff et al. |
| 2014/0137401 A1 | | 5/2014 | Lannert |
| 2014/0232514 A1 | | 8/2014 | Miura et al. |
| 2014/0292474 A1 | | 10/2014 | Ryu et al. |
| 2015/0170805 A1 | | 6/2015 | Ito et al. |
| 2015/0200043 A1 | | 7/2015 | Kamada et al. |
| 2015/0300919 A1 | | 10/2015 | Ante et al. |
| 2015/0346039 A1 | | 12/2015 | Ito |
| 2016/0299011 A1 | | 10/2016 | Ihle et al. |
| 2016/0338149 A1 | | 11/2016 | Sweeney et al. |
| 2016/0377490 A1 | | 12/2016 | Nivala et al. |
| 2017/0162303 A1 | | 6/2017 | Strallhofer et al. |
| 2017/0219440 A1 | | 8/2017 | Strallhofer et al. |
| 2017/0234818 A1 | | 8/2017 | Jesme et al. |
| 2018/0301253 A1 | | 10/2018 | Gruenbichler et al. |
| 2018/0306647 A1 | | 10/2018 | Ihle et al. |

FOREIGN PATENT DOCUMENTS

| | | |
|---|---|---|
| CN | 1192039 A | 9/1998 |
| CN | 1261977 A | 8/2000 |
| CN | 1261978 A | 8/2000 |
| CN | 1367497 A | 9/2002 |
| CN | 1433030 A | 7/2003 |
| CN | 101022048 A | 8/2007 |
| CN | 101206145 A | 6/2008 |
| CN | 102034580 A | 4/2011 |
| CN | 102052972 A | 5/2011 |
| CN | 102150259 A | 8/2011 |
| CN | 102216747 A | 10/2011 |
| CN | 102288320 A | 12/2011 |
| CN | 102674820 A | 9/2012 |
| CN | 103403862 A | 11/2013 |
| CN | 103650069 A | 3/2014 |
| CN | 203707180 U | 7/2014 |
| CN | 104124014 A | 10/2014 |
| CN | 104167269 A | 11/2014 |
| CN | 204007925 U | 12/2014 |
| CN | 104285141 A | 1/2015 |
| CN | 1774822 A | 5/2016 |
| CN | 106574872 A | 4/2017 |
| DE | 3634132 A1 | 4/1987 |
| DE | 4025715 C1 | 4/1992 |
| DE | 69001779 T2 | 1/1994 |
| DE | 4329312 A1 | 3/1994 |
| DE | 19953161 A1 | 1/2001 |
| DE | 10152537 A1 | 10/2002 |
| DE | 69808499 T2 | 1/2003 |
| DE | 102010050315 A1 | 5/2012 |
| DE | 102012110849 A1 | 5/2014 |
| DE | 112013003510 T5 | 4/2015 |
| EP | 0809094 A1 | 11/1997 |
| EP | 1227308 A1 | 7/2002 |
| EP | 1417483 A2 | 5/2004 |
| EP | 2899518 A1 | 7/2015 |
| GB | 1266706 A | 3/1972 |
| GB | 2183344 B | 3/1990 |
| JP | S60-003102 A | 1/1985 |
| JP | H0562806 A | 3/1993 |
| JP | H0682315 A | 3/1994 |
| JP | H06160204 A | 6/1994 |
| JP | H07174635 A | 7/1995 |
| JP | H08115804 A | 5/1996 |
| JP | H0921707 A | 1/1997 |
| JP | 2000150204 A | 5/2000 |
| JP | 2002048655 A | 2/2002 |
| JP | 2002305102 A | 10/2002 |
| JP | 2007093453 A | 4/2007 |
| JP | 2008157936 A | 7/2008 |
| JP | 2012129341 A | 7/2012 |
| JP | 2015129731 A | 7/2015 |
| WO | 9901875 A1 | 1/1999 |
| WO | 2003008928 A3 | 1/2003 |
| WO | 2011024724 A1 | 3/2011 |
| WO | 2012059401 A2 | 5/2012 |
| WO | 2013007575 A1 | 1/2013 |
| WO | 2014072123 A2 | 5/2014 |
| WO | 2015110986 A1 | 7/2015 |

* cited by examiner

SENSOR ELEMENT AND METHOD FOR PRODUCING A SENSOR ELEMENT

This patent application is a national phase filing under section 371 of PCT/EP2016/074942, filed Oct. 18, 2016, which claims the priority of German patent application 10 2015 118 720.5, filed Nov. 2, 2015 and German patent application 10 2016 101 248.3, filed Jan. 25, 2016, each of which is incorporated herein by reference in its entirety.

TECHNICAL FIELD

A sensor element is provided. The sensor element may serve in particular for measuring a temperature. It is, for example, an NTC sensor element (negative temperature coefficient), that is to say an NTC resistor. A method for producing a sensor element is also provided.

BACKGROUND

According to the prior art, for monitoring and controlling temperatures in a wide variety of applications, they are mostly measured by ceramic negative temperature coefficient thermistors (NTC), silicon temperature sensors (KTY), platinum temperature sensors (PRTD) or thermocouples (TC). Of these, the NTC thermistors are most commonly used, because of the low production costs. Another advantage over thermocouples and metallic resistance elements, such as, for example, Pt elements, is the significant negative resistance temperature characteristic.

For use in power modules, SMD NTC temperature sensors that are soldered on are mostly used. Also used as an alternative to this in the case of control modules for low power levels are NTC chips, which are mounted on the underside by means of Ag sintering, soldering or adhesive bonding and the upper side of which is contacted by means of a bonding wire.

For electrical contacting of the NTC ceramic, metallic electrodes have to be applied. According to the prior art, for this purpose thick-film electrodes are applied, mostly from silver or gold pastes, by means of a screen printing process with subsequent firing.

The silver metalizations are particularly suitable for soldered connections. As a result of the increasing technological requirements with regard to new reliable ways of establishing electrical contact in connections, such as bonding and welding, another electrode is necessary, especially when bonding with gold or aluminum or copper wires, because a connection to silver does not have sufficient reliability.

In the case of gold metalizations, soldered connections with terminal wires cannot be realized. For reasons of cost, only thin gold wire is used for making bonded connections. Aluminum bonding wire connections on gold electrodes do not meet the reliability requirements.

As a result of the increasing requirements with respect to operating temperature and reliability, there is also the requirement for NTC temperature sensors that can be applied to the mother board without soldered mounting and have high long-term stability and also are suitable for higher operating temperatures.

SUMMARY OF THE INVENTION

Embodiments provide a sensor element that has improved properties.

According to one aspect, a sensor element for temperature measurement is provided. The sensor element preferably comprises a ceramic sensor material. The sensor material is, for example, arranged in the sensor element in the form of at least one NTC layer. The sensor element is preferably an NTC sensor chip. Particularly preferably, the sensor element is an NTC thick-film sensor.

The sensor element may comprise a ceramic carrier. The carrier is at least partially printed with the NTC layer. The NTC layer covers at least part of a surface of the carrier. In other words, the NTC layer may cover the complete carrier surface or else only part of the carrier surface. For example, the NTC layer at least partially covers an underside of the carrier. The NTC layer may, however, also completely cover a first surface of the carrier, for example, the underside of the carrier. The sensor element is designed for wireless contacting.

According to an exemplary embodiment, the sensor element has at least one electrode, preferably at least two electrodes. The electrodes are arranged on the NTC layer, for example, in the form of two electrode pads. The electrodes are accordingly preferably located on the same side, for example, the underside, of the sensor element. The electrodes are spatially separated from one another. For example, the electrodes are separated from one another by a free region. The free region may, for example, be designed in the form of a web. The electrodes are separated from one another by the web.

According to further embodiments the free region preferably comprises ceramic sensor material. The sensor element is designed such that wireless contacting of the sensor element is made possible. In particular, the electrodes are designed and arranged such that the electrodes can be silver-sintered. In this way, a sensor element that can be flexibly used is provided.

According to an exemplary embodiment, a thickness of the NTC layer or a resistance of the NTC layer can be set by a number of printing operations. The higher the number of printing operations during a production process, the thicker the NTC layer and the greater its resistance. The lower the number of printing operations during the production process, the thinner the NTC layer and the lower its resistance.

According to an exemplary embodiment, the respective electrode has at least one sputtered layer. The electrodes are, for example, thin-film electrodes. The sputtered layer is preferably applied directly onto the NTC layer. The at least one sputtered layer preferably comprises nickel. Furthermore, the layer may comprise fractions of vanadium. In a further embodiment, the electrode has two layers, a lower layer comprising chromium or titanium and a second layer comprising nickel, it likewise being possible that the second layer comprises fractions of vanadium. Advantageously, a covering layer is applied to the nickel layer for the embodiments described. This covering layer consists of an oxidation-inhibiting metal, such as, for example, silver or gold.

According to an exemplary embodiment, the respective electrode has at least one printed-on layer. The electrodes are, for example, thick-film electrodes. The printed-on layer is preferably printed directly onto the NTC layer. The printing operation allows thicker electrode layers to be realized.

According to an exemplary embodiment, the NTC layer has a recess. The recess is intended for setting the resistance of the NTC layer. In the case of very closely toleranced resistances, a so-called trimming process may be performed for setting the resistance at nominal temperature. This involves removing a sub-region, for example, of the NTC layer, by partial laser ablation, so that a recess is created. The geometry of the layer is changed by the trimming process, and the resistance is adapted in a way corresponding to a default value.

The design described above of the NTC thick-film sensor may allow it to be applied to mother boards in just one process step (pressure sintering or soldering). This obviates the need for further contacting, for example, by means of bonding. Furthermore, there is an advantage of lower thermal loading of the NTC chip in the production process. Provided in this way is an NTC temperature sensor with a low-cost electrode system which in addition makes wireless contacting of the NTC temperature sensor possible.

According to one aspect, a method for producing a sensor element is described. Preferably, the sensor element described above is produced by the method. All of the properties that are disclosed with reference to the sensor element or the method are also correspondingly disclosed with reference to the respective other aspects, and vice versa, even if the respective property is not explicitly mentioned in the context of the respective aspect.

The method has the following steps: providing a ceramic carrier material, wherein a ceramic substrate on the basis of, for example, $Al_2O_3$, $ZrO_2$, ATZ or ZTA materials or MgO serves as carrier material and at least partially printing the carrier material with an NTC paste to form an NTC layer. The NTC paste consists on the basis of perovskites in the system Y—Ca—Cr—Al—O with various dopings or spinels in the system Ni—Co—Mn—O with various dopings. The printing of the carrier material is performed in at least one printing operation, preferably in a number of printing operations. For example, two, three, five or ten printing operations are carried out. A thickness and a resistance of the NTC layer are preferably set by a number of the printing operations.

The method may further include sintering the system comprising carrier material and NTC paste and sputtering thin-film electrodes onto the NTC layer.

As an alternative to this, the electrodes may also be printed onto the NTC layer (thick-film electrodes).

The method may further include partially removing the NTC layer by laser ablation for setting a predetermined resistance value.

According to one aspect, a sensor element for temperature measurement is provided, having a ceramic carrier, at least two electrodes, at least one NTC layer, the carrier being printed with the NTC layer, the NTC layer covering at least part of a surface of the carrier, wherein the electrodes are arranged on the NTC layer, wherein the electrodes are spatially separated from one another, and wherein the sensor element is designed such that wireless contacting of the sensor element is made possible.

The sensor element is explained in more detail below on the basis of exemplary embodiments and the associated figures.

BRIEF DESCRIPTION OF THE DRAWINGS

The drawings described below should not be regarded as true to scale. Rather, for better representation, individual dimensions may be shown as increased or reduced in size or even distorted.

Elements that are the same as one another or perform the same function are provided with the same designations.

DETAILED DESCRIPTION OF ILLUSTRATIVE EMBODIMENTS

Figure 1:
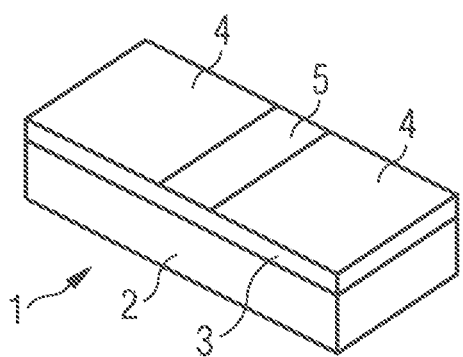
FIG. 1 shows a sensor element in a first embodiment.

FIG. 1 shows a sensor element 1, in particular a sensor chip. The sensor element 1 is preferably designed for measuring a temperature. The sensor element 1 comprises a ceramic sensor material. The ceramic sensor material takes the form of an NTC layer 3. The sensor element 1 is preferably an NTC thick-film sensor.

The NTC layer may have a thickness of between 5 µm and 200 µm. Preferably, the layer thickness lies between 10 µm and 100 µm.

The sensor material is an NTC ceramic. For example, the ceramic has a perovskite structure. In particular, the ceramic may be based on the system Y—Ca—Cr—Al—O with various dopings. Such a sensor element 1 is particularly suitable for high-temperature applications. Alternatively, in particular in the case of lower application temperatures, the sensor element 1 may comprise a ceramic with a spinel structure. For example, the ceramic may be based on the system Ni—Co—Mn—O with various dopings.

The NTC thick-film sensor consists of a ceramic carrier 2 onto which the NTC layer 3 is printed. Serving as the carrier material is a ceramic substrate on the basis of, for example, $Al_2O_3$, $ZrO_2$, ATZ or ZTA materials or MgO. These are printed with NTC pastes on the basis of perovskites in the system Y—Ca—Cr—Al—O with various dopings or spinels in the system Ni—Co—Mn—O with various dopings and fired.

Following the firing, electrodes 4 are provided on the NTC layer 3. The electrodes 4 are applied on the same outer surface of the sensor 1, for example, an underside of the sensor 1. In particular, the electrodes 4 are provided on an underside of the NTC layer 3. The electrodes 4 are arranged spatially separate. The electrodes 4 are separated from one another by a free region 5. The free region 5 is free from electrode material, or may be filled with a protective layer.

The electrodes 4 are applied to the NTC layer 3 by means of screen printing or sputtering technology (PVD process), as described in detail further below.

Figure 2:
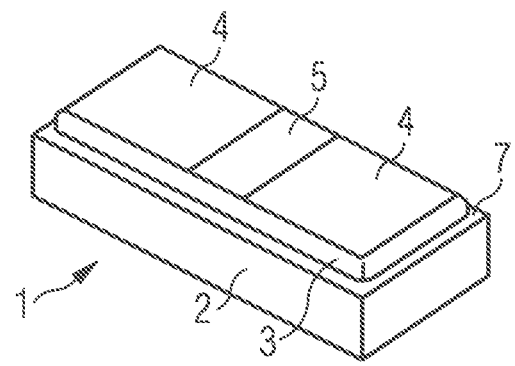
FIG. 2 shows the sensor element in a further embodiment.

FIG. 2 shows a sensor element 1 with a free edge 7. As a difference from the sensor element 1 shown in FIG. 1, in the case of the sensor element 1 shown in FIG. 2 a peripheral edge region of the carrier 2 is free from sensor material or free from the NTC layer 3. In FIG. 1, on the other hand, the sensor material (NTC layer 3) completely covers an outer surface of the carrier 2, for example, the underside of the carrier 2.

In this exemplary embodiment, the free edge 7 runs around the periphery. However, the free edge 7 may also only run partly around the periphery.

The geometry of the NTC layer 3 and a degree of coverage of the carrier 2 by the NTC layer 3 are determined by the process of printing the carrier 2 with the NTC layer 3. In particular, during the printing of the carrier 2 with NTC paste, a corresponding edge on the carrier 2 may be left without NTC paste, in order to obtain a free edge 7.

Figure 3:
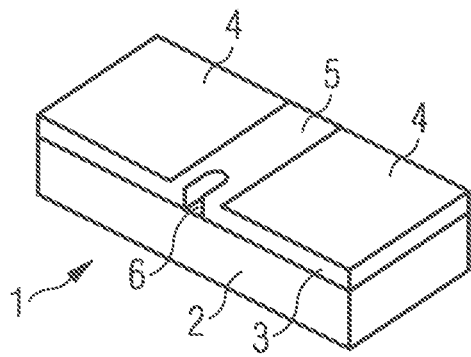
FIG. 3 shows the sensor element in a further embodiment.
Figure 4:
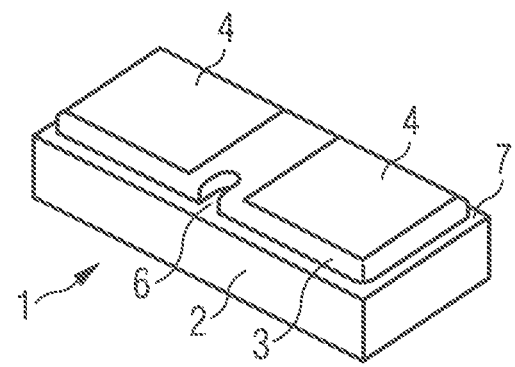
FIG. 4 shows the sensor element in a further embodiment.

In the case of very closely toleranced resistances, a so-called trimming process may be performed for setting the resistance at nominal temperature, for example, by partial laser ablation. FIGS. 3 and 4 show a corresponding exemplary embodiment. In particular, in the case of the sensor elements 1 shown in FIGS. 3 and 4, a sub-region of the NTC layer 3 between the electrodes 4 has been partially removed by laser ablation. In other words, a region has been removed from the free region 5 of the NTC layer 3 that separates the electrodes 4 from one another. At this point, the NTC layer 3 has a recess 6. This leads to a changed geometry of the NTC layer 3, whereby the resistance of the NTC layer 3 or of the sensor element 1 is set.

In FIG. 4, furthermore, a free edge 7 can again be seen. In particular, in the case of the sensor element 1 shown in FIG. 4, a peripheral edge region of the carrier 2 is free from sensor material.

According to the invention, consequently, a distinction can be made between two sensor types, in a first embodiment the NTC thick film 3 covering the complete carrier surface (FIGS. 1 and 3) and in a second embodiment the NTC thick film 3 only being applied on part of the substrate surface (FIGS. 2 and 4). The thickness of the NTC layer 3, and consequently the resistance, can be set by the number of the printing operations.

With respect to the application of the electrodes 4, a distinction can be made—as mentioned above—between thin-film and thick-film technology. The production of the thin-film electrode may be performed by sputtering or vapor deposition. In this case, in a first embodiment the base electrode consists of a nickel layer, which may comprise fractions of vanadium. A nickel-containing layer allows particularly good mechanical and electrical connection, in particular to the ceramic. A fraction of vanadium may be of advantage in particular for technical process-related reasons in the case of a sputtering method. For example, vanadium is present in the nickel-containing layer in a proportion by weight of up to 7%. Nickel is present, for example, in a proportion by weight of at least 93%. The thickness of the nickel-containing layer lies, for example, in the range from 0.3 μm to 10 μm.

In a second embodiment, the base electrode consists of two layers, the lower layer comprising chromium or titanium and the second layer consisting of nickel, which likewise may comprise fractions of vanadium.

The base electrode may be protected by a covering layer consisting of an oxidation-inhibiting metal such as, for example, silver, gold, copper, aluminum, etc. This covering electrode may just serve for protecting the nickel base electrode from corrosion (oxidation) or else be advantageous or even necessary for contacting.

In the case of a connection by means of Ag sintering with finely dispersed silver pastes, for example, a silver covering electrode is necessary. For a particularly migration-resistant, silver-free and lead-free connection, a gold covering layer may be applied.

Two electrode pads, which are spatially separated from one another by the free region 5, as can be seen from FIGS. 1 to 4, are applied on the NTC thick film 3. Depending on the later contacting method by means of Ag sintering or soldering, the thickness of the base electrode is less than 10 μm, advantageously less than 3 μm, ideally less than 0.5 μm. The thickness of the covering electrode may be up to 1 μm, in exceptional cases up to 20 μm.

In a further variant, the electrodes 4 are printed onto the NTC thick film 3 by means of thick-film technology, whereby thicker electrode layers can be realized.

The metalized substrates are electrically measured in advance. The geometry of the flip-chip sensor element is defined on the basis of the measurement data obtained in advance. Since the length is in most cases fixed, the width remains as a variable setting parameter.

For particularly closely tolerated resistances at nominal temperature, the resistance of the individual components can be set by an additional trimming process—as described above. In this case, ceramic material or electrode material is partially removed, for example, by laser cutting, grinding or sawing, in such a way that the resistance is adapted by changing the geometry.

To be able to improve the long-term stability of the ceramic, a thin, nonconducting protective layer, which consists, for example, of ceramics, glasses, plastics or metal oxides, may be applied over the unmetalized region. This can be achieved by sputtering, vapor deposition, lithography or printing and firing.

For use on mother boards, the thus metalized NTC thick-film sensor 1 may be adhesively bonded, soldered or sintered onto the conductor track. The Ag sintering process may be performed under pressure or without pressure. Further contacting by means of wires or bonding is not required.

Compared with the prior art, as a result of the silver sinterability for both electrodes 4, and without the high mechanical loading caused by bonding, in the case of which there is the risk of microdamage, the corresponding NTC thick-film sensors 1 make possible a construction with increased reliability even at an elevated application temperature.

As a result of the design of the NTC thick-film sensor 1, it can be applied to mother boards in just one process step (pressure sintering or soldering). This obviates the need for further contacting, for example, by means of bonding.

Furthermore, there is an advantage in the lower thermal loading of the NTC thick-film sensor 1 in the production process. On account of the application of the electrode 4 by means of sputtering, this obviates the need for the firing of a metalization paste at temperatures of 700-900° C. In addition, the mechanical stability of the sensor element 1 is increased by the use of ceramic carrier materials on the basis of, for example, $Al_2O_3$, $ZrO_2$, ATZ or ZTA materials or MgO.

The production of the flip-chip NTC 1 with a closely toleranced resistance is performed, for example, in the following way:

In a first step, the production of the NTC powder is performed. This step comprises, for example, initial weighing, wet pre-grinding, drying, screening, calcining, wet after-grinding, drying and screening again.

Subsequently, the initial weighing of the NTC powder for the production of the paste is performed. This is followed by initial weighing of organic components for the paste.

In a further step, the paste components are homogenized in advance by agitation. Subsequently, the homogenization of the paste components is performed with a triple roller mill.

In a further step, ceramic carrier material is at least partially printed with the NTC paste by means of screen printing. In this step, the geometry of the later flip-chip NTC is fixed.

Subsequently, the system comprising the ceramic carrier material and NTC layer is decarburized. In a further step, the system comprising the ceramic carrier material and NTC layer is sintered.

Subsequently, the application of Ni/Ag thin-film electrodes to the sintered flip-chip NTCs is performed by means of sputtering technology. Alternatively, thick-film electrodes may also be applied.

In a further step, the electrical measuring of the resistances of the individual flip-chip NTCs at nominal temperature is performed on the not yet separated carrier material. Subsequently, the individual NTC layers are trimmed to the required resistance value by laser ablation.

Lastly, the individual separation of the flip-chip NTCs is performed by sawing the carrier material between the printed NTC regions. The final geometry of the sensor element 1 is produced by the separating process. Subsequently, a visual inspection and random control measurement are performed.

The description of the subjects specified here is not restricted to the individual specific embodiments. Rather, the features of the individual embodiments can—as far as technically feasible—be combined with one another in any desired manner.

The invention claimed is:

1. A sensor element for temperature measurement comprising:
    a ceramic carrier; and
    at least one NTC layer printed on the carrier,
    wherein the NTC layer covers at least part of a surface of the carrier,
    wherein a resistance of the NTC layer is determined by a number of printing operations,
    wherein the sensor element is designed for wireless contacting,
    wherein the sensor element is an NTC thick-film sensor,
    wherein the NTC layer has a recess, and
    wherein the recess is setting a predetermined resistance value of the NTC layer.

2. The sensor element according to claim 1, further comprising at least two electrodes, wherein the electrodes are arranged on the NTC layer, and wherein the electrodes are spatially separated from one another by a free region.

3. The sensor element according to claim 2, wherein each electrode has at least one sputtered layer.

4. The sensor element according to claim 3, wherein the sputtered layer is arranged directly on the NTC layer.

5. The sensor element according to claim 2, wherein each electrode has at least one printed-on layer.

6. The sensor element according to claim 5, wherein the printed-on layer is printed directly on the NTC layer.

7. The sensor element according to claim 1, wherein the NTC layer completely covers a first surface of the carrier.

8. A method for producing the sensor element according to claim 1, the method comprising:
    providing a ceramic carrier material;
    at least partially printing the carrier material with an NTC paste to form the NTC layer, wherein printing comprises performing at least one printing operation directly on the carrier material;
    sintering the carrier material and the NTC paste in a common sintering operation; and
    sputtering thin-film electrodes on the NTC layer,
    wherein the resistance of the NTC layer is determined by a number of printing operations.

9. The method according to claim 8, wherein a thickness of the NTC layer is set by the number of printing operations.

10. The method according to claim 8, further comprising partially removing the NTC layer by laser ablation so that the predetermined resistance value is set.

11. A method comprising:
    providing a ceramic carrier material;
    at least partially printing a surface of the carrier material with an NTC paste to form an NTC layer, wherein printing comprises performing at least one printing operation directly on the surface of the carrier material, and wherein a resistance of the NTC layer is determined by a number of printing operations;
    sintering the carrier material and the NTC paste in a common sintering operation;
    partially removing the NTC layer so that a predetermined resistance value is set; and
    sputtering thin-film electrodes on the NTC layer.

12. The method according to claim 11, wherein a thickness of the NTC layer is set by the number of printing operations.

13. The method according to claim 11, wherein partially removing the NTC layer comprises removing the NTC layer by laser ablation.

14. The method according to claim 11, wherein partially removing the NTC layer comprises forming a recess.

* * * * *

UNITED STATES PATENT AND TRADEMARK OFFICE
CERTIFICATE OF CORRECTION

PATENT NO. : 10,788,377 B2
APPLICATION NO. : 15/772790
DATED : September 29, 2020
INVENTOR(S) : Jan Ihle et al.

Page 1 of 1

It is certified that error appears in the above-identified patent and that said Letters Patent is hereby corrected as shown below:

In the Claims

In Column 7, Line 16, Claim 1, delete "printed on" and insert --printed directly on--.

Signed and Sealed this
Seventeenth Day of November, 2020

Andrei Iancu
*Director of the United States Patent and Trademark Office*